(12) United States Patent
Van Vuuren et al.

(10) Patent No.: US 9,074,511 B2
(45) Date of Patent: Jul. 7, 2015

(54) REDUCTANT DELIVERY UNIT FOR SCR SYSTEMS HAVING IMPROVED DEPOSIT RESISTANCE

(71) Applicant: Continental Automotive Systems, Inc., Auburn Hills, MI (US)

(72) Inventors: Willem Nicolaas Van Vuuren, Yorktown, VA (US); Stephen C. Bugos, Poquoson, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 228 days.

(21) Appl. No.: 13/678,581

(22) Filed: Nov. 16, 2012

(65) Prior Publication Data

US 2014/0137543 A1 May 22, 2014

(51) Int. Cl.
*F01N 3/24* (2006.01)
*F01N 3/20* (2006.01)
*F01N 13/18* (2010.01)

(52) U.S. Cl.
CPC ............... *F01N 3/24* (2013.01); *F01N 3/2066* (2013.01); *F01N 13/18* (2013.01); *F01N 2610/02* (2013.01); *F01N 2610/1453* (2013.01); *Y02T 10/24* (2013.01)

(58) Field of Classification Search
CPC ............. F01N 3/2066; F01N 2610/02; F01N 2610/1453; F01N 3/24; F01N 13/18; F02M 2200/06; F02M 2200/858; B05B 15/02
USPC ......................................................... 123/467
See application file for complete search history.

(56) References Cited

U.S. PATENT DOCUMENTS

2010/0146951 A1* 6/2010 Gaudin et al. ................. 60/303
2013/0219871 A1* 8/2013 Crandell et al. ............... 60/295

* cited by examiner

*Primary Examiner* — Kenneth Bomberg
*Assistant Examiner* — Jonathan Matthias

(57) ABSTRACT

A reductant delivery unit for selective catalytic reduction (SCR) after-treatment for vehicles includes a fluid injector having a fluid inlet and a fluid outlet. The fluid inlet receives a source of urea solution. An injector flange is coupled directly with an end of the fluid injector and has a flange outlet in fluid communication with the fluid outlet of the fluid injector. The flange outlet is associated with an exhaust gas flow path upstream of a SCR catalytic converter with the fluid injector controlling injection of urea solution into the exhaust gas flow path. Internal surface structure that defines the flange outlet includes a conical surface joined with at least one radius surface. The radius surface is constructed and arranged to resist formation of deposits on the internal surface structure due to break down of the urea solution.

14 Claims, 3 Drawing Sheets

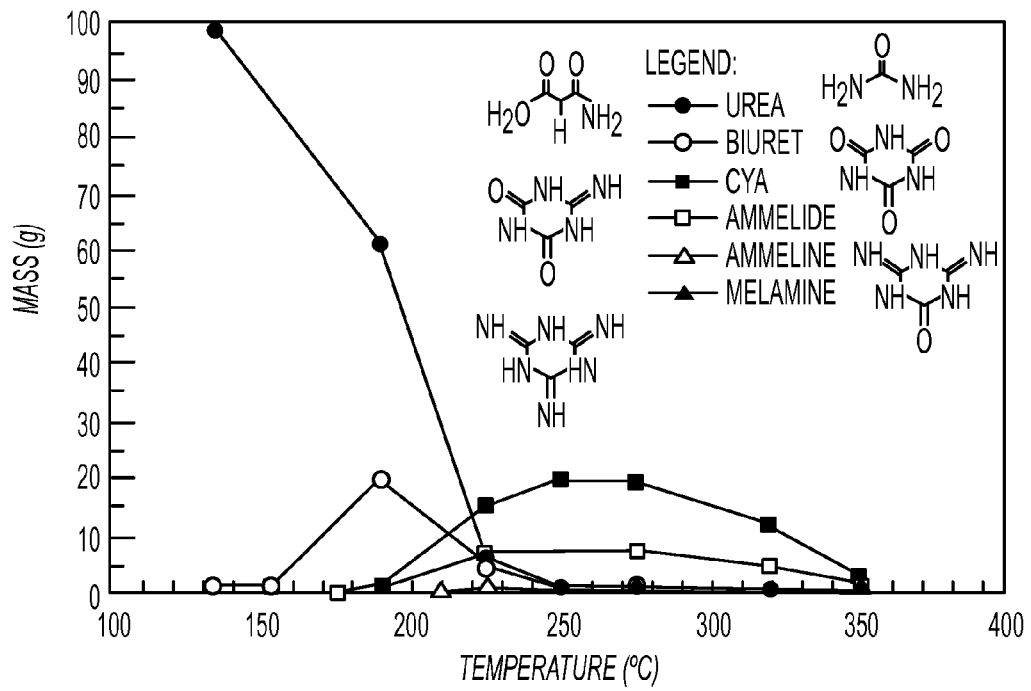
FIG. 1
PRIOR ART
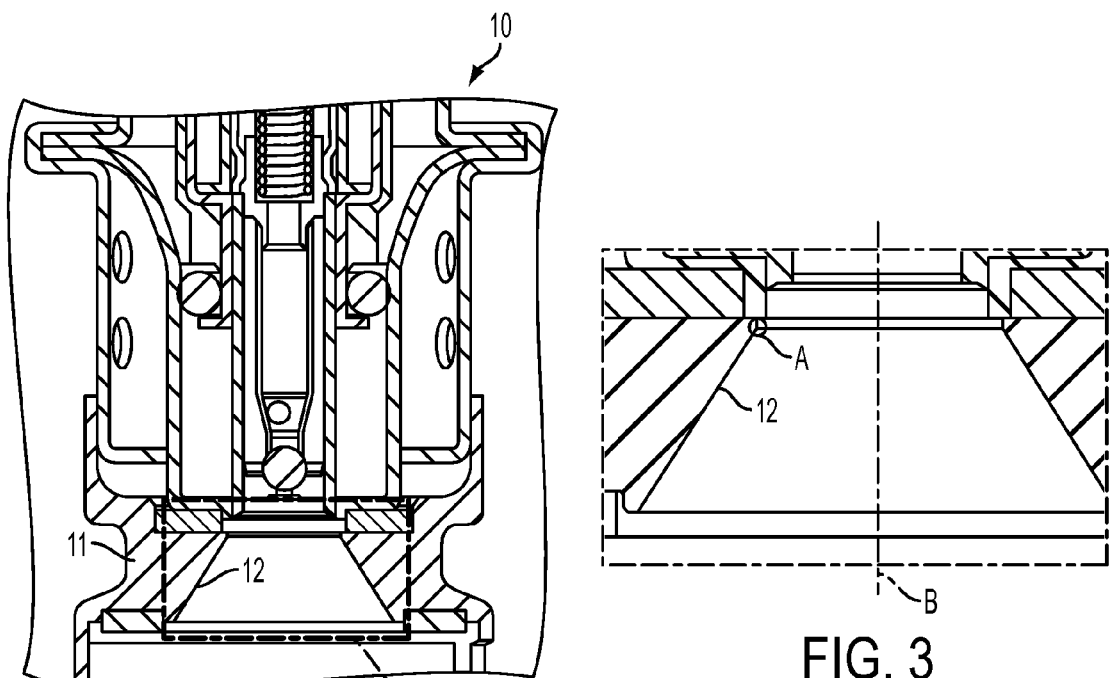
FIG. 2
PRIOR ART
FIG. 3
PRIOR ART

REDUCTANT DELIVERY UNIT FOR SCR SYSTEMS HAVING IMPROVED DEPOSIT RESISTANCE

FIELD

This invention relates to a reductant delivery unit (RDU) for that supplies reductant to an engine exhaust system and, more particularly, that improves the resistance of deposits forming thereon.

BACKGROUND

Stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Exhaust after-treatment technologies are currently being developed that will treat nitrogen oxides (NOx) under these conditions. One of these technologies includes a catalyst that facilitates the reactions of ammonia ($NH_3$) with the exhaust NOx to produce nitrogen ($N_2$) and water ($H_2O$). This technology is referred to as Selective Catalytic Reduction (SCR).

Ammonia is difficult to handle in its pure form in the automotive environment, therefore it is customary with these systems to use a liquid aqueous urea solution, typically at a 32% concentration of urea ($CO(NH_2)_2$). The solution is referred to as AUS-32, and is also known under its commercial name of AdBlue. The urea is delivered to the hot exhaust stream and is transformed into ammonia prior to entry in the catalyst.

The preferred transformation of urea is through hydrolysis and thermolysis to ammonia:

Thermolysis: $CO(NH_2)_2 \rightarrow NH_3 + HCNO$
Hydrolysis: $HCNO + H_2O \rightarrow NH_3 + CO_2$ However, urea is also known to break down into other compounds under certain conditions. Literature indicates that under pyrolysis at temperatures up to 350° C., the urea decomposes into biuret, cyanuric acid, ammeline, ammelide, and melamine. See "Thermal decomposition (pyrolysis) of urea in an open reaction vessel", Schaber et al, Thermochimica Acta 424 (2004) 131-142. FIG. 1 show plots of the mass decomposition as a function of temperature. Such organic compounds can build-up deposits on exposed surfaces that can interfere with the proper operation of the RDU. These deposits can be found on the exhaust pipe walls, but also on the injector mounting boss surfaces as well as the injector flange surface.

FIG. 2 is a cross-sectional view of a conventional RDU, generally indicated at 10, having an injector flange 11 with a conical outlet 12. FIG. 3 is an enlarged view of the conical outlet 12 of FIG. 2. The initiation point A of deposit formation on the conical outlet 12 is characterized by a sharp break with an angle of $37.2^2$ from the injector axis B. The deposits mechanism is characterized by the injection of urea into the exhaust, and then the return of the urea to the initiation point after the main injection has been completed.

Thus, there is a need to provide an RDU that is resistance to the build-up of deposits.

SUMMARY

An objective of the invention is to fulfill the need referred to above. In accordance with the principles of an embodiment, this objective is achieved by a reductant delivery unit for selective catalytic reduction (SCR) after-treatment for vehicles. The reductant delivery unit includes a fluid injector having a fluid inlet and a fluid outlet. The fluid inlet is constructed and arranged to receive a source of urea solution. An injector flange is coupled directly with an end of the fluid injector. The injector flange has internal surface structure defining a flange outlet in fluid communication with the fluid outlet of the fluid injector. The flange outlet is constructed and arranged to be associated with an exhaust gas flow path upstream of a SCR catalytic converter with the fluid injector being constructed and arranged to control injection of urea solution into the exhaust gas flow path. The internal surface structure includes a conical surface joined with at least one radius surface, with the radius surface being constructed and arranged to resist formation of deposits on the internal surface structure due to break down of the urea solution.

In accordance with another aspect of an embodiment, a method of reducing deposit formation in a reductant delivery unit for selective catalytic reduction (SCR) after-treatment for vehicles provides a reductant delivery unit including a fluid injector having a fluid inlet and a fluid outlet. The fluid inlet is constructed and arranged to receive a source of urea solution. An injector flange is coupled directly with an end of the fluid injector. The injector flange has internal surface structure defining a flange outlet in fluid communication with the fluid outlet of the fluid injector. The flange outlet is associated with an exhaust gas flow path upstream of a SCR catalytic converter so that the fluid injector controls injection of urea solution into the exhaust gas flow path. At least one surface that defines the flange outlet is configured to resist formation of deposits due to break down of the urea solution.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 1 is a conventional plot of mass decomposition of urea as a function of temperature.

FIG. 2 is a cross-section view of a flange of a conventional RDU having a conical outlet.

FIG. 3 is an enlarged view of the enclosed portion of FIG. 2.

DETAILED DESCRIPTION OF EXEMPLARY EMBODIMENTS

Figure 4:
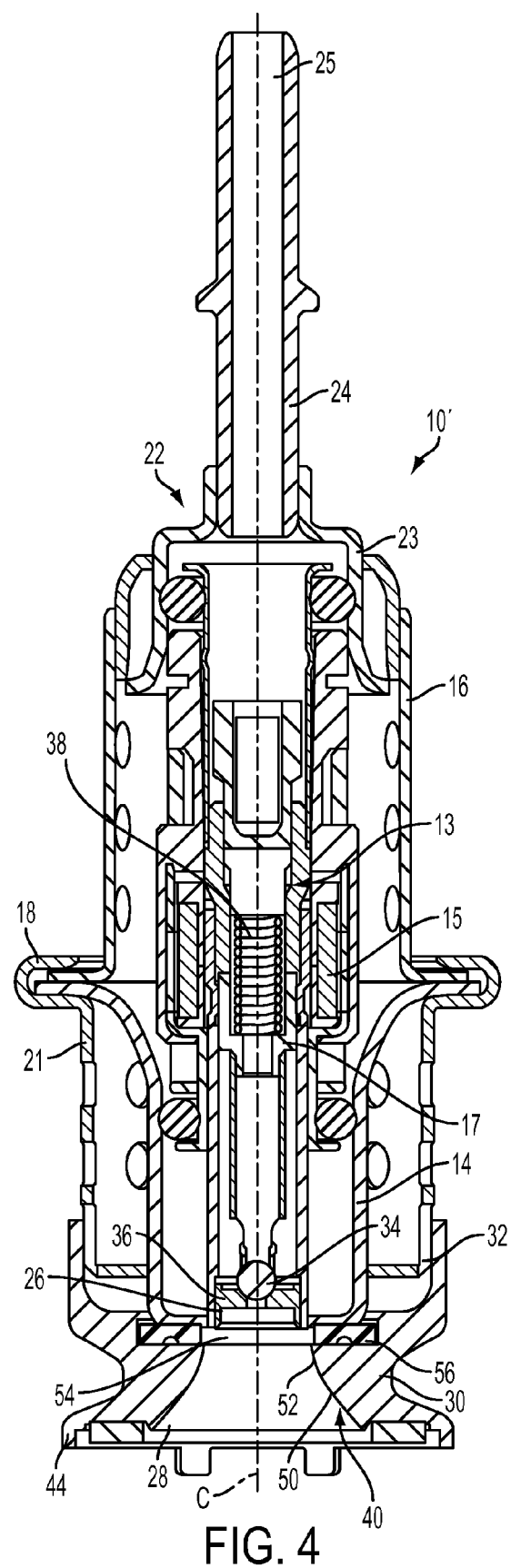
FIG. 4 is a cross-sectional view of an RDU having a flange provided in accordance with an embodiment.

With reference to FIG. 4, an RDU is shown, generally indicated at 10', in accordance with an embodiment. The RDU 10' can be employed in a system of the type disclosed in U.S. Pat. No. 8,024,922, the contents of which is hereby incorporated by reference into this specification.

The RDU 10' includes a solenoid fluid injector, generally indicated at 13, that provides a metering function of fluid and provides the spray preparation of the fluid into the exhaust path of a vehicle in a dosing application. Thus, the fluid injector 13 is constructed and arranged to be associated with an exhaust gas flow path upstream of a SCR catalytic converter. The fluid injector 13 is preferably a gasoline, electrically operated, solenoid fuel injector such as the type disclosed in U.S. Pat. No. 6,685,112, the content of which is hereby incorporated by reference into this specification. Thus, the injector 13 has a coil 15 and a movable armature 17.

The fluid injector 13 is disposed in an interior carrier 14. An injector shield 16 is coupled to the carrier 14 by a folding down tangs of a flange 18 of body 21 over shelf features of the carrier 14 and the shield 16. Thus, the shield 16 is fixed with respect to the injector 13. An inlet cup structure, generally indicated at 22, includes a cup 23 and an inlet tube 24 integral with the cup 23. The cup structure 22 is in fluid communication with an inlet 25 of the injector 13. The inlet tube 24 is in communication with a source of urea solution (not shown) that is fed to the injector 13 to be injected from an injector outlet 26 of the injector 13. The injector outlet 26 is fluidly connected with a flange outlet 28 of an injector flange 30 that is coupled directly with an end 32 of the body 21. When the coil 15 is energized, the seal member 34 of the armature 17 is lifted off seat 36 to permit urea solution to pass through the injector outlet 26 to flange outlet 28. When the coil 15 is de-energized, a spring 38 biases the end seal member 34 of the armature 17 into sealing engagement with the seat 36.

Figure 5:
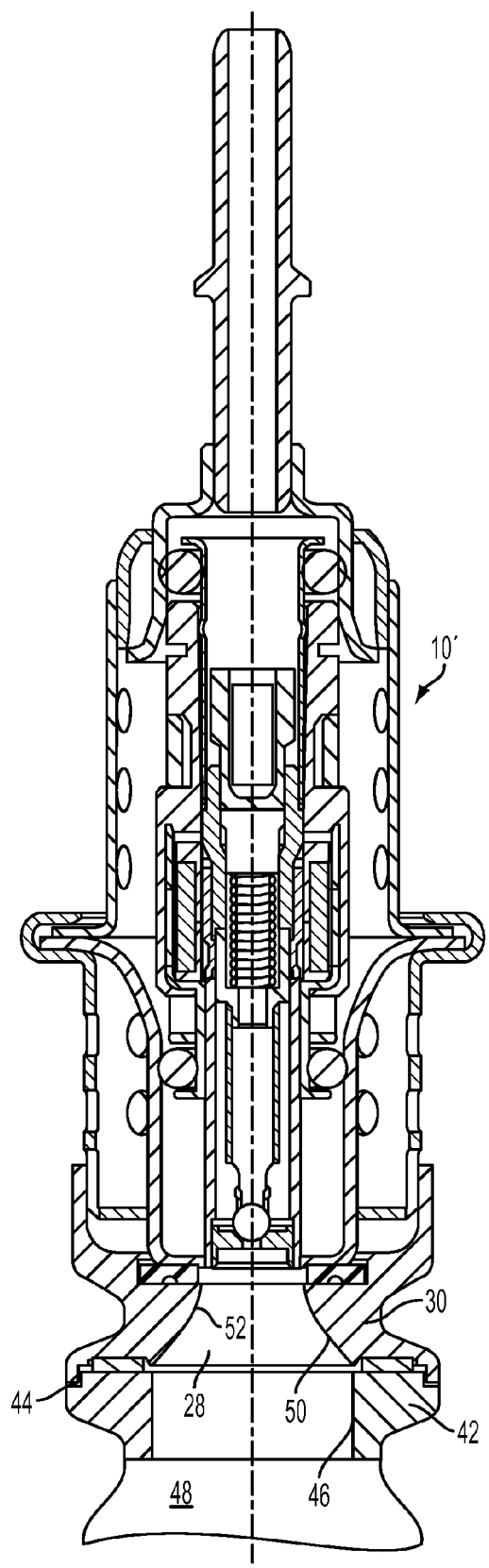
FIG. 5 is a view of the RDU of FIG. 4, shown coupled with an exhaust boss of an exhaust gas flow path.

The injector flange 30 includes internal surface structure, generally indicated at 40, that defines the flange outlet 28 that delivers fluid into an exhaust boss 42 (FIG. 5) of an exhaust flow path. Thus, as shown in FIG. 5, the flange 30 is coupled to an end 44 of the exhaust boss 42 with the flange outlet 28 communicating with a bore 46 of the boss 42. The bore 46 communicates with the exhaust flow path 48. The flange 30 provides a mechanical support that mounts the injector so that the tip is placed in a remote position with respect to the hot exhaust gases.

In order to improve the resistance of deposit formation on the internal surface structure 40 of the injector flange 30, the internal surface structure 40 includes a conical surface 50 that is joined with at least one radius surface 52. In the embodiment, the conical surface 50 defines the open end of the flange 30 and is joined with the radius surface 52, with the radius surface 52 being joined directly with a gasket shelf surface 54 of the flange 30. Thus, the conical surface 50 is downstream of the radius surface 52. The gasket shelf surface 54 is disposed generally perpendicular with respect to a longitudinal axis C of the injector 13. A gasket 56 rests on the gasket shelf surface 52 to seal the flange 30 with respect to the body 21.

The radius surface 52 has been found to limit or reduce the formation of deposits that would otherwise collect on the internal surface structure 40 of the flange 30, absent the radius surface (as in the RDU shown in FIG. 3).

Figure 6:
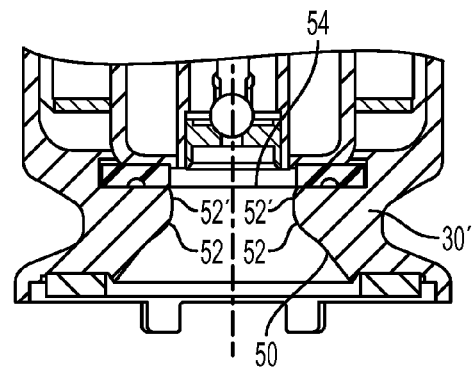
FIG. 6 is an enlarged view of another embodiment of a flange of an RDU.

With reference to FIG. 6, another embodiment of the flange 30' includes, a second radius surface 52' of a radius different from that of radius surface 52 (e.g., is smaller) joins the gasket shelf surface 54 with the radius surface 52.

The radius surface 52 (or surfaces 52, 52') can be used in any RDU having an injector flange 30 with an outlet 28.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A reductant delivery unit for selective catalytic reduction (SCR) after-treatment for vehicles, the reductant delivery unit comprising:
    a fluid injector having a fluid inlet and a fluid outlet, the fluid inlet being constructed and arranged to receive a source of urea solution, and
    an injector flange coupled directly with an end of the fluid injector, the injector flange having internal surface structure defining a flange outlet in fluid communication with the fluid outlet of the fluid injector, the flange outlet being constructed and arranged to be associated with an exhaust gas flow path upstream of a SCR catalytic converter with the fluid injector being constructed and arranged to control injection of urea solution into the exhaust gas flow path,
    wherein the internal surface structure includes a conical surface joined with at least one radius surface, the conical surface being joined with the at least one convex convex radius surface with a smooth, non-pointed transition, with the at least one convex radius surface being constructed and arranged to resist formation of deposits on the internal surface structure due to break down of the urea solution, the conical surface being downstream of the at least one convex radius surface.

2. The unit of claim 1, wherein the injector flange includes a gasket shelf surface disposed substantially perpendicular with respect to a longitudinal axis of the injector, and wherein the at least one convex radius surface joins the conical surface with the gasket shelf surface.

3. The unit of claim 2, further comprising a second radius surface joining the gasket shelf surface with the at least one radius surface.

4. The unit of claim 3, wherein the second radius surface has a radius different from a radius of the at least one convex radius surface.

5. The unit of claim 4, wherein second radius surface has a smaller radius than the radius of the at least one convex radius surface.

6. The unit of claim 1, in combination with an exhaust boss of an exhaust gas flow path, the exhaust boss having a bore in communication with the exhaust flow path, the injector flange being coupled with the exhaust boss so that the flange outlet communicates with the bore.

7. A reductant delivery unit for selective catalytic reduction (SCR) after-treatment for vehicles, the reductant delivery unit comprising:
    a fluid injector having a fluid inlet and a fluid outlet, the fluid inlet being constructed and arranged to receive a source of urea solution, and
    an injector flange coupled directly with an end of the fluid injector, the injector flange having flange outlet in fluid communication with the fluid outlet of the fluid injector, the flange outlet being constructed and arranged to be associated with an exhaust gas flow path upstream of a SCR catalytic converter with the fluid injector being constructed and arranged to control injection of urea solution into the exhaust gas flow path,
    wherein the injector flange includes a conical surface joined smoothly with at least one convex radius surface, the injector flange being configured to provide resistance to formation of deposits on surfaces associated with the reductant delivery unit due to break down of the urea solution, the conical surface being downstream of the at least one convex radius surface.

8. The unit of claim 7, wherein the injector flange includes a gasket shelf surface disposed substantially perpendicular with respect to a longitudinal axis of the injector, and wherein the at least one convex radius surface joins the conical surface with the gasket shelf surface.

9. The unit of claim 8, further comprising a second radius surface joining the gasket shelf surface with the at least one radius surface.

10. The unit of claim 9, wherein the second radius surface has a radius different from a radius of the at least one convex radius surface.

11. The unit of claim 10, wherein second radius surface has a smaller radius than the radius of the at least one convex radius surface.

12. The unit of claim 7, in combination with an exhaust boss of an exhaust gas flow path, the exhaust boss having a bore in communication with the exhaust flow path, the injector flange being coupled with the exhaust boss so that the flange outlet communicates with the bore.

13. A method of reducing deposit formation in a reductant delivery unit for selective catalytic reduction (SCR) after-treatment for vehicles, the method comprising the steps of:

providing a reductant delivery unit comprising a fluid injector having a fluid inlet and a fluid outlet, the fluid inlet being constructed and arranged to receive a source of urea solution, and an injector flange coupled directly with an end of the fluid injector, the injector flange having internal surface structure defining a flange outlet in fluid communication with the fluid outlet of the fluid injector, associating the flange outlet with an exhaust gas flow path upstream of a SCR catalytic converter so that the fluid injector controls injection of urea solution into the exhaust gas flow path, and configuring the flange outlet to resist formation of deposits due to break down of the urea solution by providing a conical surface joined with at least one convex radius surface with a smooth, non-pointed transition, the conical surface being provided downstream of the at least one convex radius surface.

14. The method of claim 13, wherein the injector flange includes a gasket shelf surface disposed substantially perpendicular with respect to a longitudinal axis of the injector and the at least one convex radius surface joins the conical surface with the gasket shelf surface.

* * * * *